(12) United States Patent
Richter

(10) Patent No.: US 9,579,861 B2
(45) Date of Patent: Feb. 28, 2017

(54) LAMINATE PRE-FORM FOR A WIND TURBINE BLADE

(75) Inventor: Jed Richter, Cowes (GB)

(73) Assignee: Vestas Wind Systems A/S, Aarhus N. (DK)

(*) Notice: Subject to any disclaimer, the term of this patent is extended or adjusted under 35 U.S.C. 154(b) by 847 days.

(21) Appl. No.: 13/978,328

(22) PCT Filed: Dec. 6, 2011

(86) PCT No.: PCT/DK2011/050463
§ 371 (c)(1),
(2), (4) Date: Sep. 20, 2013

(87) PCT Pub. No.: WO2012/092927
PCT Pub. Date: Jul. 12, 2012

(65) Prior Publication Data
US 2014/0003955 A1 Jan. 2, 2014

Related U.S. Application Data

(60) Provisional application No. 61/429,939, filed on Jan. 5, 2011.

(30) Foreign Application Priority Data

Jan. 5, 2011 (DK) .................................. 2011 70003

(51) Int. Cl.
*B29D 99/00* (2010.01)
*B29C 70/54* (2006.01)
(Continued)

(52) U.S. Cl.
CPC ........ *B29D 99/0025* (2013.01); *B29C 70/465* (2013.01); *B29C 70/547* (2013.01);
(Continued)

(58) Field of Classification Search
CPC . B29D 99/0025; B29C 70/465; B29C 70/547; F01D 5/282; F03D 1/065; F03D 1/062; F05B 2230/31; F05B 2280/6003
(Continued)

(56) References Cited

FOREIGN PATENT DOCUMENTS

| WO | 2004078442 A1 | 9/2004 |
| WO | 2009077582 A1 | 6/2009 |
| WO | 2009133143 A1 | 11/2009 |

OTHER PUBLICATIONS

International Searching Authority, Search Report and Written Opinion issued in corresponding International No. PCT/DK2011/050463 dated Apr. 19, 2012, 8 pages.

(Continued)

*Primary Examiner* — Craig Kim
*Assistant Examiner* — Danielle M Christensen
(74) *Attorney, Agent, or Firm* — Wood Herron & Evans LLP

(57) ABSTRACT

A laminate preform is disclosed, having a top side and a back side extending between respective edge portions, the laminate preform comprising a plurality of layers of fiber tows extending in a length direction of the laminate pre-form, the fiber tows being at least partly fixed by resin. The laminate pre-form is in between a first and a second prepreg or semi-preg layer including fibers extending in an oblique direction with respect to the length direction, and at least one distribution channel is provided at the back side extending in the length direction. Also disclosed is a method for manufacturing such a laminate pre-form.

12 Claims, 2 Drawing Sheets

(51) Int. Cl.
*F01D 5/28* (2006.01)
*B29C 70/46* (2006.01)
(52) U.S. Cl.
CPC ............ *F01D 5/282* (2013.01); *Y02P 70/523* (2015.11); *Y10T 428/24124* (2015.01)
(58) Field of Classification Search
USPC ................................................ 264/511, 571
See application file for complete search history.

(56) References Cited

OTHER PUBLICATIONS

Danish Patent Office, Combined Search and Examination Report issued in corresponding DD Application No. PA201170003 dated Aug. 16, 2011, 12 pages.

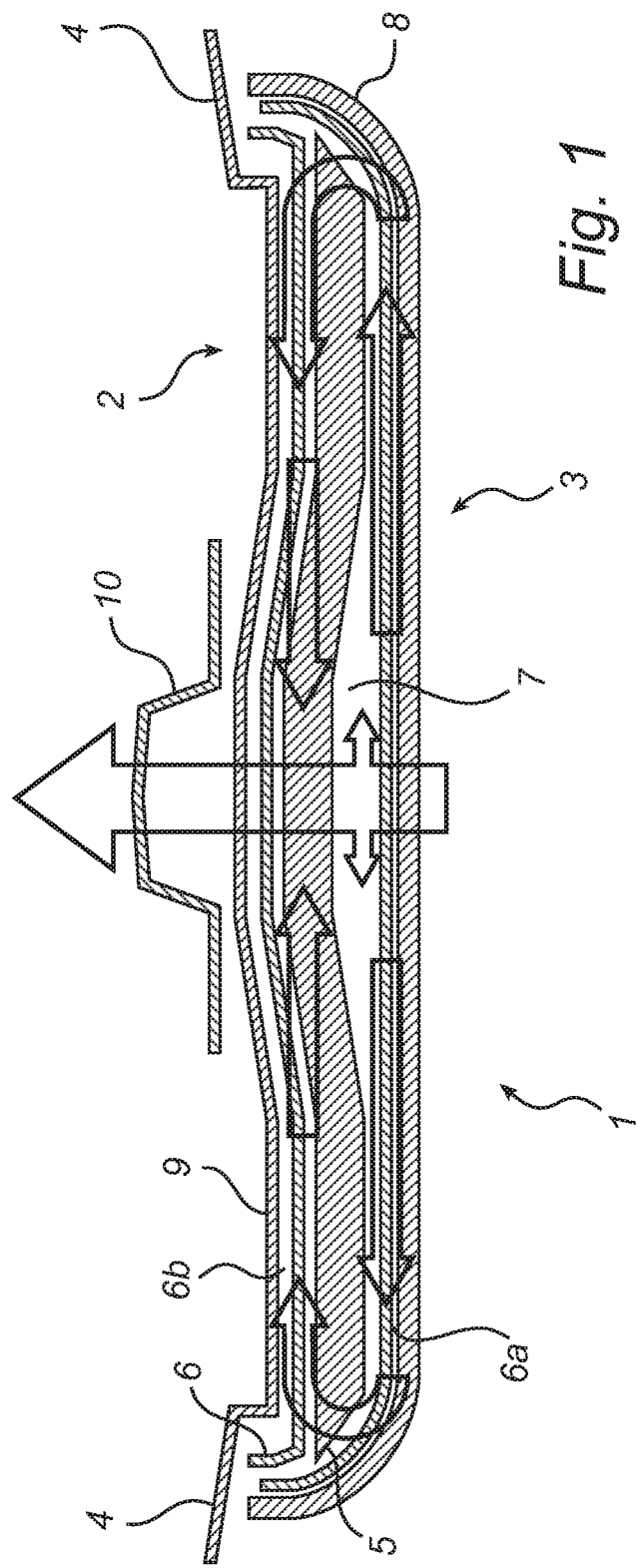

LAMINATE PRE-FORM FOR A WIND TURBINE BLADE

TECHNICAL FIELD

The present invention relates to a laminate pre-form for a wind turbine blade, comprising fibres and a fixing resin, for reinforcing a composite structure. The invention also relates to a method of producing such a pre-form.

BACKGROUND OF THE INVENTION

Composite structures, such as wind turbine blades, usually comprise a plurality of layers of sheets made of fibres embedded in a resin. These semi-finished component can be called pre-forms.

Traditionally, such preforms have been produced by cutting layers of sheets from an endless sheet material of fibres in a resin, and stacking them in layers on each other to form a composite structure. The composite structure is then consolidated by removal of any air trapped between the layers of the structure, usually by applying a vacuum. During this consolidation procedure, additional resin may be introduced to, or infused in, the structure to fill any voids therein to strengthen the structure.

Air trapped in the pre-form may decrease the strength of the finished pre-form, and is therefore unwanted.

WO 2009/077582 discloses a method for preparing a pre-form comprising several layers of fibre tows being fixed by a resin. In order to remove trapped air from the pre-form, an encapsulation step is suggested, allowing air removal from the enclosure to draw out the trapped air. To facilitate removal of trapped air, the layers of resin may be distributed in a non-continuous manner.

WO2004/078442 discloses a method for fabricating a pre-consolidated pre-form comprising a resin and a plurality of layers of oriented fibers arranged in fibre tows.

A pre-form is a composite material comprising fibres and an uncured or only partly cured resin. The fibres are preferably provided in layers of oriented fibres like for example individual fibres, fibre tows, fibre tow-pregs or prepregs.

By pre-consolidation is herein meant a process, whereby gas inside a pre-form is removed and a low porosity pre-form is produced. Pre-consolidation involves redistribution of a resin and optionally a redistribution of fibres. Furthermore, pre-consolidation may involve a limited curing of the resin. Pre-consolidation is particularly useful as it produces a dense pre-form (hereinafter named a pre-consolidated pre-form). Pre-consolidated pre-forms and composites prepared from pre-consolidated pre-forms will be appreciated amongst others due to good reproducibility, low porosity, high homogeneity, high strength, ability to plastically shaping of the pre-consolidated pre-form, ability to be connected to other pre-forms and/or other structures, suitability for automation and long shelf life without premature curing.

The present invention provides an improved technique of facilitating the removal of trapped air in a pre-consolidating process. The present invention provides an improved technique for reducing the occurrence of intra-layer voids during the formation of a pre-consolidated prepreg. With intra-layer voids is here intended voids that may appear inside a prepreg structure.

SUMMARY OF THE INVENTION

The present invention relates to a pre-consolidated laminate pre-form for a wind turbine blade having a top side and a back side extending between respective edge portions, said laminate pre-form comprising a plurality of layers of continuous fibre tows extending in a length direction of said laminate pre-form, said fibre tows being at least partly fixed by at least one non-continuous layer of resin, wherein said plurality of layers of continuous fiber tows are positioned in between a first and a second prepreg or semi-preg layer including fibres extending in an oblique direction with respect to said length direction, and at least one distribution channel is provided at the back side extending in said length direction. The first and second prepreg or semi-preg layers may be part of an envelope encapsulating the laminate pre-form.

The fibres extending in an oblique direction with respect to said length direction will form vacuum-paths across the laminate pre-form. Further, gas escape paths are provided through the material in a vertical direction via an open structure of the non-continuous layer(s) of resin. Where these paths are inhibited in a local area due to local variation in the material, the distribution channel can divert gas in the length direction of the laminate around the local inhibition. The evacuation of the air from the laminate take place through the laminate, which at the beginning of the curing process is a porous structure allowing air to be evacuated. During the curing process the porosity is gradually decreased such that in the end of the curing process the laminate forms a substantially dense structure with a low porosity, suitably down to below 0,5%. In the curing process, the gradual decrease of the porosity will lead to a reduced capacity of air removal through the laminate. In other words, the distribution channel is arranged to redistribute evacuation flow from an area of the laminate pre-form having lower air removal capacity to another area having higher air removal capacity. The local air removal capacity will largely depend on how far the curing process has proceeded in the area concerned. The inventive laminate pre-form thereby allows air trapped within the structure to be removed in a very efficient way.

Furthermore, by arranging the distribution channels in the length direction of the laminate and parallel to the fibre tows, the channels may be formed without bending or stretching the continuous fibres in the fibre tows. In the event the channels would be running in a cross direction to the extension of the fibre tows, the individual fibres would be curled by an imprinting of a channel into the laminate. After curing of the laminate by application of heat, the curled property of the continuous structure will remain. This will increase the elasticity of the laminate in an undesired fashion. On the other hand, in the event the distribution channels and the fibre tows extend in the length direction, imprinting of the channels will not bend or curl the continuous fibres in the fibre tows, which leads to that the desired rigidity of the laminate will be obtained.

The distribution channels are shaped to enable redistributing air via said at least one distribution channel provided at from a first area of said laminate pre-form having lower air removal capacity to a second area having higher air removal capacity. The air removal capacity may vary along the length extension of the laminate preform. Generally the prepreg will be an essentially two dimensional structure having a length extension and a width. The length will generally be longer than the width. Both the length extension and the width are considerably larger than the thickness of the structure. The variation of the removal capacity may be assessed over intervals corresponding to the width of the laminate. At two neighbouring areas having each a length extension corresponding to the width of the laminate, the average removal capacity may vary significantly both from the outset and during the curing process. The air removal capacity of the laminate will depend on the initial porosity of the layers forming the laminate and how far the curing process has proceeded. The redistribution channels will enable redistribution of the flow from the first area to the second area to avoid formation of any substantial air pockets. In the process of curing the laminate is subjected to a very low absolute pressure in order to drive the evacuation of the air from the laminate. In the curing process also the evacuation channels will collapse due to the low absolute pressure at which the laminate is exposed to. It may be desirable to maintain a capacity of redistribution which is in proportion to the amount of air remaining in the laminate. For this reason it may be appropriate to provide redistribution channels with varying cross sectional areas, such that a collapse of channels may occur gradually. One way of obtaining this is to provide redistribution channels of different cross sectional areas in the laminate.

As an example the laminate may include channels, which may be provided as a single hemispherical channel with a diameter of 15 mm or a number of smaller channels (radius 1-6 mm)) along the entire length of a carbon-fibre/epoxy pre-forms provided from a process as described in patent no WO 2004/078442.

In another example a distribution of large, medium sized and small distribution channels may be arranged. As an example large channels can be provided with a cross section area corresponding to a diameter of 10 mm together with medium sized channels with a cross section area corresponding to a diameter of 4 mm and small sized channels with a cross section area corresponding to a diameter of 1 mm.

Typically, these that pre-forms are between 6-20 mm in thickness. The pre-forms may be formed of a plurality of layers of fiber tows, sometimes with intermediate layers of biaxial fabric or carbon tissue/veil. Resin layers are provided to enable fixation of the fibers in the laminate. Furthermore biaxial fabrics in semi-preg or prepreg format are provided above and below the fibre tows and resin layers to form a complete laminate for the component. In the process of providing the pre-forms a step of evacuation is performed to remove the air from the structure and to adhere the layers of fiber tows to the biaxial fabrics.

Laminate structures made with these materials may be very long, for example up to 40-80 m, but having a narrow width, for example less than 1 m,—in these components, the biaxial fabric will form a vacuum-path across the part (i.e. across the narrow dimension) successfully enough. Vacuum paths in the vertical direction will be provided by the arrangement of the layer(s) of resin in a non-continuous fashion, that is by arranging the layers of resin with an open area. However, due to local variation in the material sometimes the path can be inhibited in a local area—in which case having an additional longitudinal vacuum path that can divert 'around' the local inhibition is attractive. This allows other areas of higher permeability to transmit their vacuum to the local inhibited area that would otherwise have a lower vacuum level.

Preferably, the prepreg or semi-preg envelope is a biaxial prepreg, e.g. a 600-1200 gsm+−45 deg biaxial E-glasssemi-preg or prepreg. Alternatively the envelope may be a 600-1200 gsm unidirectional E-glass prepreg or semipreg. These materials have excellent properties in terms of forming the kind of vacuum paths desired according to the invention.

In a preferred embodiment of the present invention, the laminate pre-form is arranged in a mold, where the back side of the pre-form 1 faces the mold.

The laminate pre-form of the present invention is particularly suitable to be used in a wind turbine blade.

The invention also relates to a method for preparing a laminate pre-form having a top side and a back side extending between respective edge portions, said pre-form comprising at least two layers of fibre tows being at least partly fixed by a resin, the method comprising the steps of:

distributing a first fibre layer of fibre tows onto the first layer of resin, said fibre tows extending in a length direction of said laminate pre-form;

providing a at least on non-continuous layer of reinforcement resin material;

locating the first fibre layer and at least on non-continuous layer of reinforcement resin material in between a first and a second prepreg or semi-preg layer including fibres extending in an oblique direction with respect to said length direction of said laminate pre-form; and providing at least one distribution channel at said back side of said laminate pre-form, said distribution channel extending in said length direction.

In a further step, the inventive method further comprises removal of air from the pre-form. Thereby, the amount of trapped air included in the pre-form is minimized. As a consequence, the strength of the finished pre-form is increased.

Redistribution of air is from a first area of said laminate pre-form having lower air permeability to a second area having higher air permeability is performed by the distribution channels.

Optionally the method includes a method step of distributing further fibre layer of fibre tows onto the second layer of resin, said fibre tows extending in a length direction of said laminate pre-form. The individual fibre layers may include recirculation channels extending in, across or obliquely to the length extension of the laminate. Preferably these internal channels also extend in the length direction of the laminate. However a major part of the redistribution should preferably be made at the back side of the laminate prepreg. This may be obtained by forming any redistribution channel in the back side with substantially larger cross section than any internal channels in the laminate. The back side of the laminate is the side of the laminate which rests on a mould surface prior to evacuation.

The resin may be provided by impregnating the laminate or the individual layers of continuous fibres with a non-continuous pattern of resin or by adhering a perforated or partially open sheet of resin to one or more layers of continuous fibre tows.

Optionally the method includes the step of applying the resin to an internal surface of a reinforcement material leaving a contact surface with said prepreg or semi-preg envelope dry. With a dry surface is intended a surface essentially free of resin.

Internal redistribution channels may be provided by the provision of a sheet of resin having a three dimensional structure. Internal redistribution channels may assist the distribution channel provided on the back side of the laminate with redistribution of gas along the length extension of the laminate in order to reduce the occurrence of gas pockets in the laminate. In this event the sheet of resin should have a structural rigidity to carry the next layer of fibres, when the pre-form is built.

Alternatively internal distribution channels may be provided by adding one or more e.g. biax glass fibre sheets (or other suitable sheet) between the layers of carbon in the slab could perhaps also act as an evacuation channel.

Anyhow, for the purpose of this invention it is of importance that distribution channels are provided at the back side extending in said length direction, which distribution channels on the back side may serve for a major part of the redistribution between areas having low permeability and areas with higher permeability.

In a still further step, the inventive method further comprises curing of the pre-form. In the case of a semi-rigid laminate pre-form, this step provides for the possibility of having the distribution channel removed in the ready-made laminate pre-form due to collapse of the channel upon application of heat.

BRIEF DESCRIPTION OF THE DRAWINGS

FIG. 1 shows a schematic view of a pre-form according to the present invention.

DETAILED DESCRIPTION OF THE INVENTION

Figure 2A:
FIG. 2 shows examples of geometries of the distribution channels included in the pre-form according to the present invention.

With reference to FIG. 1, the present invention relates to a pre-consolidated laminate pre-form 1 having a top side 2 and a back side 3 extending between respective edge portions 4.

The laminate pre-form 1 comprises a plurality of layers of fibre tows 5 extending in a length direction of said laminate pre-form 1.

Different types of fibres, such as glass fibres, carbon fibres, synthetic fibres, bio fibres, mineral fibres, and metal fibres can be used depending on the final use of the pre-form. For reinforcing a large composite structure, which is subject to significant stress, such as a wind turbine blade spar, carbon fibres are preferred, since they are much stronger than e.g. glass fibres. The pre-form comprises fibres in fibre tows which are bundles of a large number of individual fibres, i.e. bundles of unidirectional fibres.

Each fibre tow may comprise fibres which are twisted in a manner known, e.g. from rope making etc., or may comprise fibres arranged side by side in a straight non-twisted fashion. The fibre tows may contain only fibres, or it may contain fibres and a binder for binding the fibres. The binder may comprise resin, e.g. similar to that resin fixing the fibre tows.

The pre-form may include identical types of fibre tows. Alternatively, different layers of fibre tows may contain different types of fibre tows, e.g. one layer of fibre tows may be made of carbon fibre tows, whereas another layer of fibre tows may be made of glass fibre tows.

The fibre tows are arranged substantially parallel to each other and are at least partly fixed to each other by a resin.

The resin may be an organic polymeric liquid resin which, when converted into its final state for use, consolidates and becomes solid. As an example, the resin may be an epoxy-based resin or a polyester-based resin, though other resin types may also be applied. Furthermore, one or more different resin types may be applied. If using different types of resin, it may however be an advantage to use resins of one family to ensure compatibility between them. The resin may be provided by impregnating or by providing a separate layer of resin adhering to one or mare layers of fibre tows.

The process of pre-consolidated pre-form may involve a limited curing. Alternatively the pre-consolidation process will not involve any significant effects of curing. The limited curing may involve a release of up to 50% or the energy that will be released by a complete curing of the resin. However, it is preferred that the extent of curing is limited to an extent that will allow the pre-form to be deformed plastically. The degree of curing that will allow for plastically deformation of a pre-consolidated pre-form depends amongst others on the exact resin as well as on the fibre type and fibre content. Generally, it is preferred that the limited curing involves less than about 20% of the energy that will be released by a complete curing of the resin and more preferably that the limited curing involves between 3 to 15% of the energy that will be released by a complete curing.

Generally speaking, the pre-consolidation process should reduce the porosity of a pre-form, however, it is preferred that the resulting porosity of the pre-consolidated pre-form is less than 5% by volume, preferably less than 2% by volume and more preferably less than 1% by volume. In some cases, a porosity of even 1% may reduce the properties of a composite considerably. In these cases, it will be appreciated that the method and the pre-consolidated pre-forms may be produced with porosities well below 1%. For example, a reproduced porosity of about 0.2% by volume was realised for a composite with 60% carbon fibres in epoxy. The reduction of the porosity may for example be a result of exposing the pre-form to a pressure and/or a vacuum in relation to the pre-consolidation process.

The porosity of the pre-consolidated pre-form can not be established directly, as a density is not known and may vary throughout the material. Hence, the porosity should be established by optical method on a materialographic sample. Preparation of materialographic samples from an uncured pre-consolidated pre-form is very demanding, since the material comprises both a very soft element (i.e. a resin) and a very hard element (i.e. the fibre). To establish a reproducible result, it is hence necessary to cure the pre-form prior to materialographic preparation. This curing should be pressureless to ensure that the porosity is unaffected by the process.

The pre-form may comprise an arbitrary number of layers of fibre tows and resin depending on the use of the pre-form. A fibre tow contains a high number of parallel individual fibres, typically ranging from a couple of hundred fibres to several thousand fibres.

The pre-form will have varying properties along the length extension due to variations in permeability of the resin layers.

The fibre tow layers are positioned between a first and a second prepreg or semi-preg layer 6a, 6b which includes fibres extending in an oblique direction with respect to the length direction along which the fibre tows extend. In the embodiment shown, the first and second layers 6a, 6b are parts of an envelope 6 enclosing the laminate pre-form. The envelope 6 is preferably a biax prepreg orsemipreg having an extension at typically +−45 degrees with respect to the length direction. Other inclinations at +−30 degrees or orthogonally to the length direction are also possible.

By "a prepreg" is meant pre-impregnated fibres containing fully wet-out fibres/filaments—whereas semi-preg is partially-impregnated materials—usually the fibre bundles are not impregnated. The degree of wet-out can vary from almost zero (the fibres sit-on top of a dry resin film) through to materials where the resin has flowed around the fibres to present a wet surface on both sides—but the fibre bundles (yarns, tows, etc.) are not wet-out themselves. The latter is more typical of the materials used in wind-energy currently.

A release film 9 may be applied on the top side 2 of the pre-form (1). The release film provides a barrier between the structual prepregs and the vacuum-consumables used for evacuating air and consolidating the materials. The release film preferably provides a clean rough surface to the laminate. The release film is easily separated from the laminate.

The laminate pre-form encapsulated in the prepreg envelope is generally positioned inside a mold 8, where the back side 3 of the pre-form 1 faces the mold 8.

At least one distribution channel 7 extending in the length direction of the laminate pre-form is provided at the back side 3 of the pre-form 1. Thus, the distribution channel 7 is located at the side of the pre-form facing the mold 5. In the following, where "distribution channel" is mentioned in singular, it is to be understood to include also the case when two or more distribution channels are used.

This longitudinally extending distribution channel 7 serves to redistribute air along the length extension of the pre-form 1. In particular, the distribution channel 7 is arranged to redistribute an evacuation flow from an area of the laminate pre-form having lower air permeability to an area of the laminate pre-form having higher air permeability.

It is possible to include one or more distribution channels in the pre-form depending on the use of the pre-form. If one single distribution channel is included, it may take the form of a hemispherical channel with a diameter of e.g. 1-15 mm. Other geometries such as top hat section, square, rectangular, triangular or omega shape may also be contemplated.

Alternatively, if several distribution channels are included, they make take the form of hemispherical channels with a diameter of 3-10 mm, preferably 3-6 mm. The distribution channel(s) is/are generally distributed along the entire length of the pre-form. The use of longitudinal distribution channel(s), i.e. channels arranged in the same direction as the fibres, is advantageous as compared with distribution channels arranged vertically to the fibres. The reason is that the fibres may be damaged if they would have to be shaped into the same geometry as the distribution channel(s).

Figure 2B:
Figure 2C:

With reference to FIG. 2, examples of possible channel geometries are shown. Geometry A shows an example of several distribution channels, while geometry B shows an example of one single distribution channel.

The fibres of the prepreg or semi-preg envelope provide evacuation channels directed toward the edge portions 4 of the laminate pre-form, and also toward the distribution channel 7. Thereby, trapped air is conveniently removed from the pre-form.

The pre-form generally has a thickness of 6-25 mm, preferably 6-20 mm. A plurality of pre-forms may be used with intermediate layers, e.g. of biaxial fabric or carbon tissue/veil. In either case, a prepreg or semi-preg envelope encapsulates the laminate pre-form.

The inventive pre-form may be uncured or only partly cured. This allows the pre-form to be bent and formed to fit in a composite structure which it should reinforce. The fixing resin could be chosen such that it has a viscosity, under the relevant storage conditions, high enough to maintain the integrity of the pre-form even in an uncured state.

Preferably, the laminate pre-form is semi-rigid at room temperature, such that the channel geometry is maintained. In this embodiment, the distribution channel has the ability to collapse and "disappear" into the laminate, e.g. when the pre-forms are sucked together by the applied vacuum, and/or when heated during the cure of the pre-form. By collapsing the distribution channel, a better and stronger connection between the pre-forms is obtained, thereby improving the strength of the structure.

In the inventive method for preparing a laminate pre-form 1, a mold 8 is usually provided as a work surface on which the pre-form is prepared. Then, an arbitrary number or layers of fibre tows and resin are provided until the number of layers makes the pre-form suitable for a specific purpose.

In order to ensure that the fibre tows remain in the length direction of the laminate pre-form, the layers of resin are distributed before distributing a layer of fibre tows, as the resin fixes the fibre tows and prevent movement of each fibre tow relative to the other fibre tows.

The steps of distributing the resin may advantageously be automatically or partly automatically be carried out by the use of a nozzle device, since the resin may contain components which may irritate or may be harmful when in contact with the skin of a person distributing the resin.

In the next step, all the layers are encapsulated in an enclosure comprising a prepreg or semi-preg material including fibres extending in an oblique direction with respect to the length direction of the laminate pre-form 1.

The layers may e.g. be encapsulated by covering the work surface with a cover so that at least a part of the work surface forms part of the enclosure for the layers.

The distribution channel 7 may e.g. be prepared by post-formation on the pre-form, by imprinting or by preparing the pre-form on a suitably shaped substrate. It is furthermore possible that the distribution channel may be provided by distributing the fibre tows in a way such that a lateral distance is present between two laterally neighbouring fibre tows at certain distances, where the gap so provided will form a distribution channel. In order to avoid that fibre tows position on top of the gap will not fall in and fill the gap, suitably a non-continuous layer of resin may act as barrier preventing an immediate collapse of the distribution channel. Finally the distribution channels may be formed in the resin as longitudinal passages present in the resin material.

Trapped air may be removed from the enclosure e.g. by applying a vacuum using an external vacuum channel 10.

Subsequently to removal of air, the pre-form may be heated to at least partly cure the resin. When heating the layers, the work surface may be moved to a heater so that the layers are heated while they are still arranged on the work surface. Alternatively, the pre-form may be moved to another surface on which the pre-form may be heated.

During this heating step, the distribution channel may collapse and "disappear" into the laminate, depending on the rigidity of the laminate pre-form.

Figure 3:
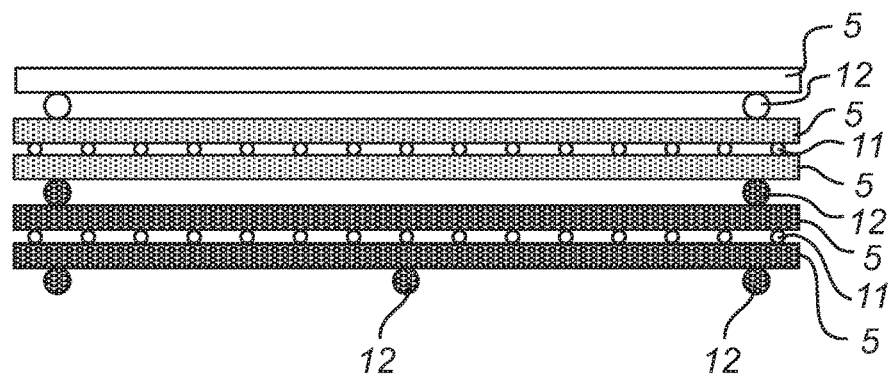
FIG. 3 shows a schematic cross sectional view of a pre-form.

In FIG. 3 an example of a schematic sectional view of a pre-form is shown indicating an example of the order of the components. In a real pre-form, the distance between the layers would be much smaller and the resin and adhesive would usually be partially absorbed into the layers of fibres. Layers of oriented fibres arranged in fiber tows 5 are provided with an adhesive 12 between them. The adhesive may be replaced with additional layers of resin. Two layers of resin 11 are also shown. The resin 11 is here distributed as a number of lines at an angle-here about orthogonal-to the fibre tows 5. The resin hence is distributed in a non-continuous layer to allow for gas to escape from the pre-form orthogonal to the direction of the fibre tows. With a non continuous layer of resin is intended a layer of resin that allows gas to escape in a vertical direction through the laminate, that is in the thickness direction of the laminate. The resin may be provided as a separate sheet which is perforated or by application of resin in a pattern, for instance as strings extending in an oblique or transversal direction with respect to the length direction of the laminate. The strings may be arranged in a biaxial fashion. The pre-form to be pre-consolidated is having at least one non-continuous layer of resin, through which gas may be removed during the pre-consolidation process. Hence, the gas need not be removed from the pre-form in a plane of a layer of resin or in a plane of a layer of fibres. The transportation distance and risk of having trapped gas inside the pre-consolidated pre-form is greatly reduced.

An example of a method for securing that gas may continuously be removed from the pre-form during pre-consolidation involves a gradual activation of the pre-consolidation process starting either from the centre of the pre-form and moving towards the surfaces or from a side or edge and moving through the pre-form. For example this may be realised by heating from the reaction surface only, hence activating gradually from the side of the pre-form in contact with the reaction surface or by controlled microwave heating, hence activating gradually from the inside of the pre-form and moving towards the surfaces.

The resin may be applied as a pattern of strips or as a pattern of dots or otherwise shaped elements that ensures that the resin layer form a non-continuous open surface. In FIG. 3 the resin is provided between two layers of fibre tows. This is the preferred positioning of resin and when this positioning is used. However, the resin may also be provided in contact with only one layer of fibre tows, i.e. in the top or at the bottom of the pre-form.

The invention claimed is:

1. A pre-consolidated laminate pre-form for a wind turbine blade having a top side and a back side extending between respective edge portions, the laminate pre-form comprising:
   a plurality of layers of continuous fibre tows extending in a length direction of the laminate pre-form, the fibre tows being at least partly fixed by at least one non-continuous layer of resin,
   wherein the plurality of layers of continuous fibre tows are positioned in between a first and a second prepreg or semi-preg layer, the first and second prepreg or semi-preg layers including fibres extending in an oblique direction with respect to the length direction, and
   wherein at least one distribution channel is provided at the back side of the laminate pre-form extending in the length direction.

2. The laminate pre-form according to claim 1, wherein the at least one distribution channel is arranged to redistribute evacuation flow from a first area of the laminate pre-form having lower air permeability to a second area having higher air permeability.

3. The laminate pre-form according to claim 1, wherein the first and the second prepreg or semi-preg layers form an envelope that is a biaxial prepreg.

4. The laminate pre-form according to claim 1, wherein the pre-form is arranged in a mold, where the back side of the pre-form faces the mold.

5. A wind turbine blade comprising a laminate pre-form according to claim 1.

6. A method for preparing a laminate pre-form having a top side and a back side extending between respective edge portions, the pre-form comprising a plurality of layers of fibre tows being at least partly fixed by a resin, the method comprising:
   distributing a first fibre layer of fibre tows, the fibre tows extending in a length direction of the laminate pre-form;
   providing at least one non-continuous layer of resin material;
   locating the first fibre layer of fibre tows in between a first and a second prepreg or semi-preg layer, the first and second prepreg or semi-preg layers including fibres extending in an oblique direction with respect to the length direction of the laminate pre-form; and
   providing at least one distribution channel at the back side of the laminate pre-form, the distribution channel extending in the length direction.

7. The method according to claim 6, further comprising: removing air from the laminate pre-form.

8. The method according to claim 6, further comprising: providing a mold on which the pre-form is prepared.

9. The method according to claim 6, further comprising: redistributing air via the at least one distribution channel provided at from a first area of the laminate pre-form having lower air permeability to a second area having higher air permeability.

10. The method according to claim 6, further comprising: distributing a further fibre layer of fibre tows onto a second layer of resin, the fibre tows extending in a length direction of the laminate pre-form.

11. The method according to claim 6, wherein the first and the second prepreg or semi-preg layers form an envelope that is a biaxial prepreg.

12. The method according to claim 6, further comprising: curing the pre-form.

* * * * *